US008239188B2

(12) United States Patent
Liu

(10) Patent No.: US 8,239,188 B2
(45) Date of Patent: Aug. 7, 2012

(54) EXAMPLE BASED TRANSLATION APPARATUS, TRANSLATION METHOD, AND TRANSLATION PROGRAM

(75) Inventor: Shaoming Liu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1250 days.

(21) Appl. No.: 11/692,464

(22) Filed: Mar. 28, 2007

(65) Prior Publication Data

US 2008/0059146 A1   Mar. 6, 2008

(30) Foreign Application Priority Data

Sep. 4, 2006   (JP) ................................ 2006-239612

(51) Int. Cl.
*G06F 17/28* (2006.01)
(52) U.S. Cl. ..................... 704/4; 704/2; 704/3; 704/7
(58) Field of Classification Search ............... 704/1–10
See application file for complete search history.

(56) References Cited

U.S. PATENT DOCUMENTS

| 5,510,981 | A | * | 4/1996 | Berger et al. ................... 704/2 |
| 5,724,593 | A | * | 3/1998 | Hargrave et al. ................ 704/7 |
| 5,956,668 | A | * | 9/1999 | Alshawi et al. ................. 704/2 |
| 6,493,709 | B1 | * | 12/2002 | Aiken ............................. 1/1 |

FOREIGN PATENT DOCUMENTS

| JP | 6-83864 A | 3/1994 |
| JP | 8-106474 A | 4/1996 |
| JP | 2005-107597 A | 4/2005 |

OTHER PUBLICATIONS

Sato, Satoshi and Nagao, Makoto. "Toward Memory Based Translation." Dept of Electrical Engineering, Kyoto University, 1990.*
Nirenburg, Sergei, et al. "A full Text Experiment in Example-Based Machine Translation." Carnegie Mellon University, 1994.*
Imamura, K. et al. "Example-based Machine Translation Based on Syntactic Transfer with Statistical Models." Proceedings of the 20th International Conference on Computational Linguistics, 2004.*
Brockett, C. et al. "English-Japanese Example-Based Machine Translation Using Abstract Linguistic Representations." ACL, 2002.*

* cited by examiner

*Primary Examiner* — Talivaldis Ivars Smits
*Assistant Examiner* — Shaun Roberts
(74) *Attorney, Agent, or Firm* — Sughrue Mion, PLLC

(57) ABSTRACT

A translation apparatus is provided that includes a bilingual example sentence dictionary that stores plural example sentences in a first language and plural example sentences in a second language being translation of the plural example sentences, an input unit that inputs an input sentence in the first language, a first search unit that searches whether the input sentence matches any of the plural example sentences in the first language, a second search unit that searches for at least one example sentence candidate that is similar to the input sentence from the plural example sentences in the first language, when a matching example sentence is not found in the first search unit, and an output unit that outputs an example sentence in the second language that is translation of an example sentence searched in the first search unit or the example sentence candidate searched in the second search unit.

12 Claims, 18 Drawing Sheets

FIG. 6

For (i=1 to i=L; i+1)

Hash(s) = Hash(S) or ( $c_i$ << (i and 0x0f ) )

Hash(s) = Hash(s) mod L

|   |   | Or operation |
|---|---|---|
| 0 | 0 | 0 |
| 0 | 1 | 1 |
| 1 | 0 | 1 |
| 1 | 1 | 1 |

|   |   | And operation |
|---|---|---|
| 0 | 0 | 0 |
| 0 | 1 | 0 |
| 1 | 0 | 0 |
| 1 | 1 | 1 |

<<Operation

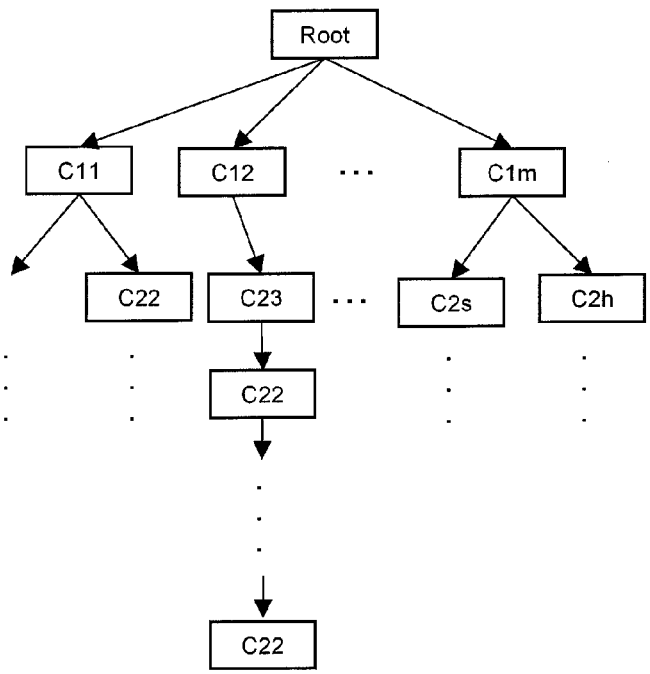

| Node ID | Character C | Flag | Pointer to sample sentence number list record when flag=1 | Node ID of parent node | Node ID of left sibling node |
|---|---|---|---|---|---|
| | | | | | |

| Flag | Meaning |
|---|---|
| 0 | Internal node |
| 1 | N-gram node: Information on path from root to the node represents N-gram |

| Number of example sentence that contains Bi-gram "character I, character j" | Number of example sentence that contains Bi-gram "character I, character j" |
|---|---|
| . . . | . . . |

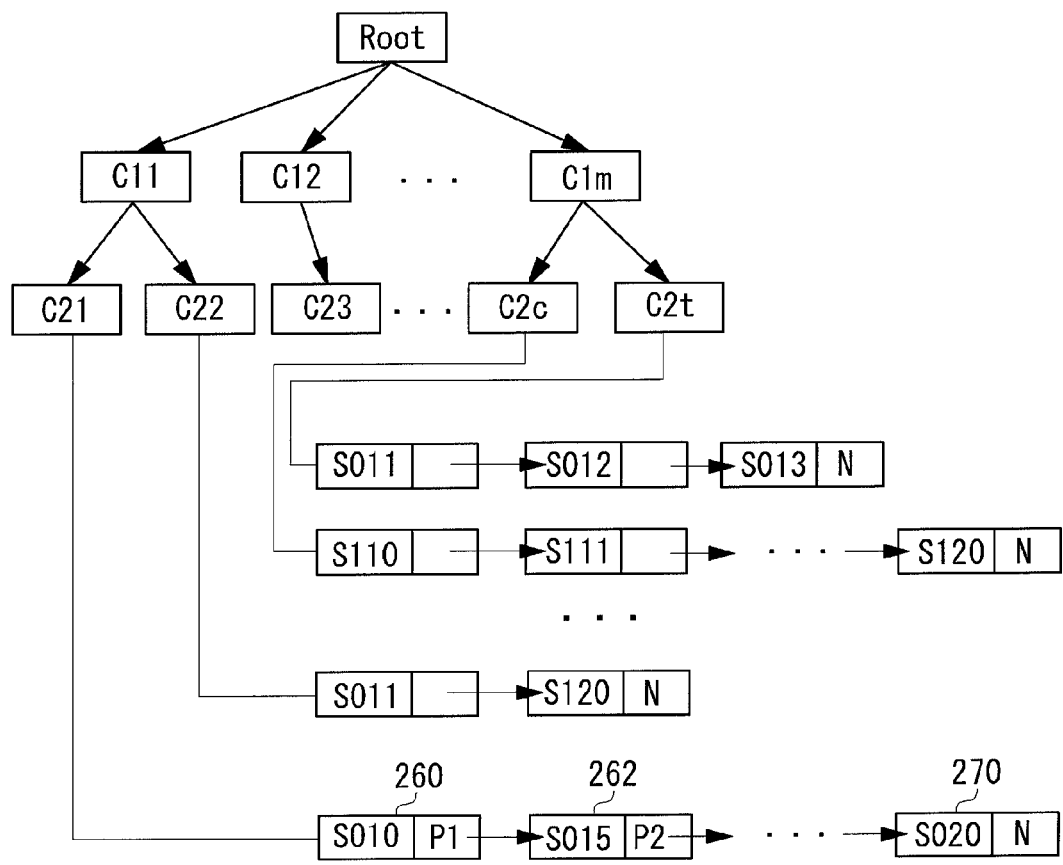
FIG. 10  Bi-gram TRIE structure

FIG. 12

116 Sentence-to-sentence bilingual sentence dictionary portion

250

| Address of NEXT example sentence in first language | The number of N-gram | SC1 | Address of NEXT example sentence in second language |
|---|---|---|---|
| | The number of N-gram | SJ1 | |
| ... | | ... | ... |
| | | ... | |
| Address of NEXT example sentence in first language | The number of N-gram | SCi | Address of NEXT example sentence in second language |
| | The number of N-gram | SJi | |
| ... | | ... | ... |
| | | ... | |

FIG. 16

| Character 0 | Pointer to Bi-gram list |
| Character 1 | Pointer to Bi-gram list |
| . . . | . . . |
| Character i | Pointer to Bi-gram list |
| . . . | . . . |

FIG. 17

| Character i | Pointer to number list of example sentence that contains Bi-gram " Character i character j" | Pointer to Bi-gram list of next Bi-gram " Character i character h" |
|---|---|---|
| . . . | | . . . |
| . . . | | . . . |

FIG. 18

| Number of example sentence that contains Bi-gram " Character i character j" | Pointer to number list record of example sentence that contains next same Bi-gram |
|---|---|
| . . . | . . . |

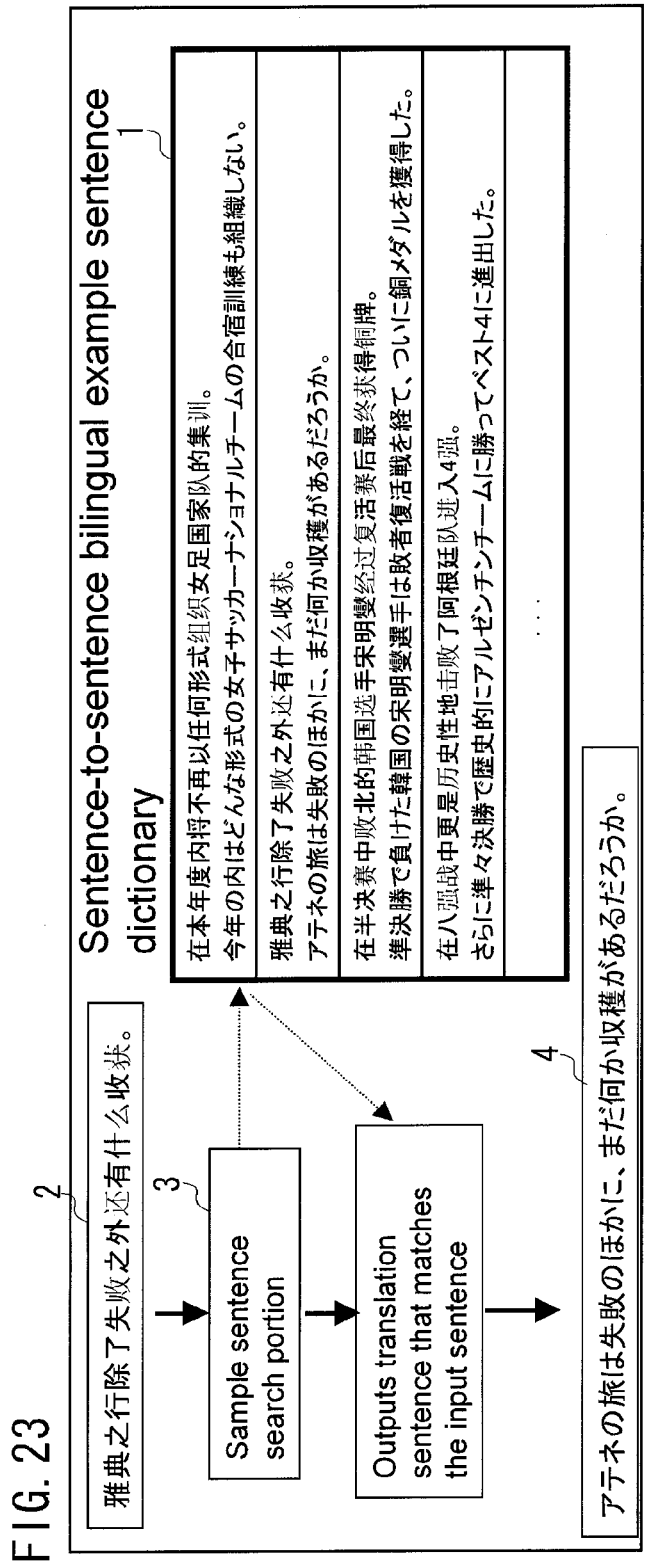

EXAMPLE BASED TRANSLATION APPARATUS, TRANSLATION METHOD, AND TRANSLATION PROGRAM

BACKGROUND

1. Technical Field

The present invention relates to a translation apparatus, translation method and translation program using a bilingual example sentence dictionary.

2. Related Art

Machine translation is a transformation from a language into another language using a computer. It has been researched and developed for half a century around the world. Approaches for machine translation can be roughly classified into three; (1) analysis-based machine translation approach, (2) example-based machine translation approach, and (3) statistic-based machine translation approach.

The analysis-based machine translation approach is a technique that performs, for example, morphemic analysis, syntactic and semantic analysis of a first language, transforms the result of the analysis into a second language, and generates a translation sentence in the second language. The technique for analyzing natural language is still immature, and thus the practical use of the analysis-based machine translation approach has been facing limit. In addition, because of lack of learning capability, it is difficult to improve or alter a translation engine.

The statistic-based machine translation approach is a technique that builds a translation model by using a language model and statistical model. Learning data (corpus) that is necessary for building each model is limited, and thus it is difficult to put it in practical use.

The example-based machine translation approach mimics a mechanism in which a human learns a foreign language. It translates a new document by referring to translation of example sentences that are already learned. This approach was first proposed by Professor Nagao in the 1980s. Since then, research and development of this approach have been intensively conducted.

Alternatively, there are translation assisting systems for assisting translation work. Translation assisting software differs from machine translation software in that, when a sentence is not be correctly translated, the translation assisting software provides to a translator a similar example sentence and a translation sentence or partial translation result of the example sentence from a stored bilingual example sentence dictionary.

FIG. 23 illustrates an outline of a bilingual example sentence dictionary. The bilingual example sentence dictionary shown in FIG. 23 includes a memory 1 that stores plural example sentence pairs of an example sentence in Chinese and an example sentence in Japanese corresponding to the Chinese sentence. When an input sentence 2 in Chinese is inputted by a user, an example sentence search portion 3 searches for an example sentence in Chinese that matches the input sentence 2, and outputs a translation sentence 4 in Japanese that corresponds to the input sentence 2.

With a bilingual example sentence dictionary of a related art, matching between an input sentence and an example sentence has been searched for, and thus information of translation sentences other than the translation of the example sentence that matches the example sentence cannot be obtained. Therefore, even if an example sentence that is similar to the input sentence is stored, a user cannot use the similar example sentence, which means that the bilingual example sentence dictionary has not been effectively used. In addition, when a document data scanned using an OCR (optical character recognition) system is used for the input sentence, if there is any error recognition in the scanning, the matching with example sentences results in mismatch, and translation of the input sentence cannot be obtained although the matching example sentence is stored.

As methods for searching for an example sentence in a bilingual example sentence dictionary, there are a character index method and word index method. The former creates a character index for every character that exists in a bilingual corpus. With this method, it is difficult to translate in real time because the amount of data to be searched for becomes huge amount. The latter creates a word index for every word that exists in a bilingual corpus. This requires a morphemic analysis to extract a word from the input sentence, and thus if the result of the morphemic analysis is not correct, translation becomes difficult. The morphemic analysis is not adequate especially for technical terms and idioms.

SUMMARY

An aspect of the present invention provides a translation apparatus that includes a bilingual example sentence dictionary that stores plural example sentences in a first language and plural example sentences in a second language that are translation of the plural example sentences in the first language, an input unit that inputs an input sentence in the first language, a first search unit that searches whether or not the input sentence matches any of the plural example sentences in the first language in the bilingual example sentence dictionary, a second search unit that searches for at least one example sentence candidate that is similar to the input sentence from the plural example sentences in the first language in the bilingual example sentence dictionary, when a matching example sentence is not found in the first search unit, and an output unit that outputs an example sentence in the second language that is translation of an example sentence searched in the first search unit or the example sentence candidate searched in the second search unit.

BRIEF DESCRIPTION OF THE DRAWINGS

Embodiment(s) of the present invention will be described in detail based on the following figures, wherein:

FIG. 6 illustrates an example of a hash value calculation portion;

FIG. 9 illustrates a TRIE structure of an N-gram index;

FIG. 10 illustrates a Bi-gram TRIE structure;

FIG. 12 illustrates example sentence count regions of a bilingual example sentence dictionary portion;

FIG. 16 illustrates details of a first language Bi-gram first character list of the Bi-gram index portion shown in FIG. 15;

FIG. 17 illustrates details of a first language Bi-gram list of the Bi-gram index portion shown in FIG. 15;

FIG. 18 illustrates details of a first language example sentence number list of the Bi-gram index portion shown in FIG. 15;

FIG. 23 illustrates an outline of a sentence-to-sentence example sentence dictionary of a related art.

DETAILED DESCRIPTION

Figure 1:
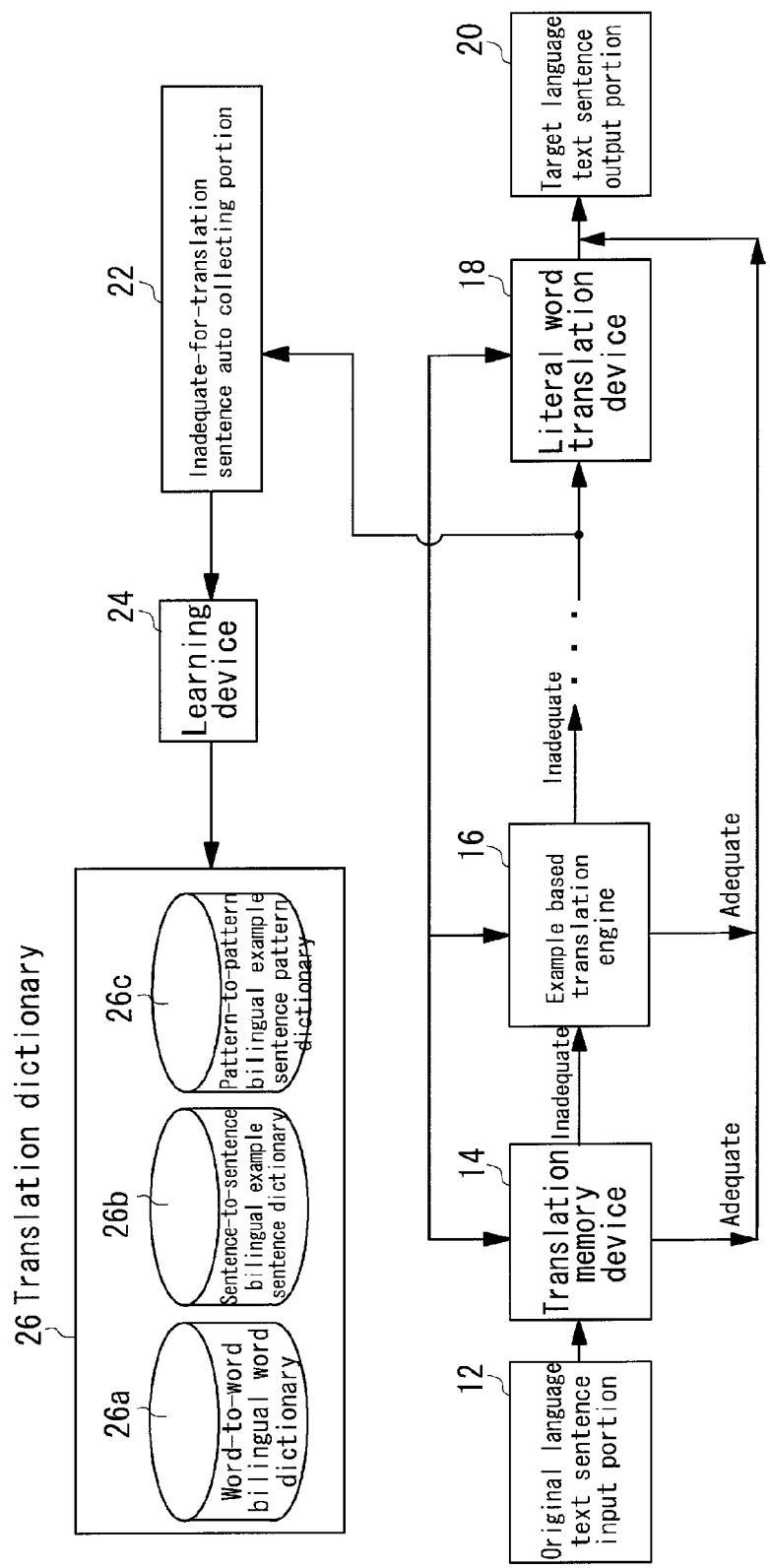
FIG. 1 is a block diagram illustrating a configuration of a machine translation system.

FIG. 1 illustrates a general view of a machine translation system according to an example of the present invention. A machine translation system 10 is designed for performing translation from simpler translation to more complicated translation to speed up translation. In addition, the machine translation system 10 has a learning function that automatically collects a portion that is not translated, and provides an exact corresponding translation.

The machine translation system 10 includes a translation memory device 14 that translates a sentence in a unit of sentence that is inputted from an original language text sentence input portion 12; an example-based translation device 16 that inputs the input sentence that is not matched in the translation memory device 14, that is, the input sentence designated as inadequate, and translates an example sentence pattern of, for example, morphemically analyzed words of the input sentence; a literal word translation device 18 that inputs a word, which is not translated in the example-based translation device 16, as an inadequate word, and translates the word; and a target language text sentence output portion 20 that produces and outputs a text sentence in a target language based on the result that is adequately translated by the translation device described above.

The machine translation system 10 further includes an inadequate-for-translation sentence auto collecting portion 22 that collects a sentence that is not translated in the example-based translation device 16 and produces adequate translation for the collected sentence, a learning device 24 that performs check or correction of the translation produced by the inadequate-for-translation sentence auto collecting portion 22, and a translation dictionary 26. The translation dictionary 26 includes a bilingual word dictionary 26a that stores a word in a first language and a word in a second language being translation of the word, a bilingual example sentence dictionary 26b that stores an example sentence in a first language and an example sentence in a second language being translation of the example sentence, and a example sentence pattern-based pattern dictionary 26c that stores an example sentence pattern in a first language and an example sentence pattern in a second language being translation of the example sentence pattern. The translation dictionary 26 may be used in the translation memory device 14, the example-based translation device 16, and the literal word translation device 18. The machine translation system of FIG. 1 is an exemplary configuration, and may include a translation engine other pattern-based one, for example.

Figure 2:
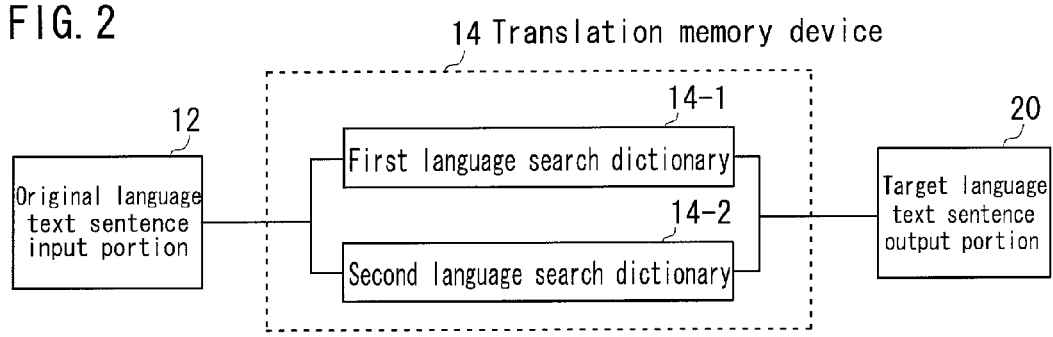
FIG. 2 is a block diagram schematically illustrating a translation memory device according to an example of the present invention.

In this example, the translation memory device 14 used in the machine translation system 10 has a new feature. FIG. 2 illustrates a configuration of a translation memory device according to an example of the present invention. The translation memory device 14 includes a first language search dictionary 14-1 and a second language search dictionary 14-2. When an input sentence in a first language or in a second language is inputted, the first and second language search dictionaries 14-1 and 14-2 search for an example sentence that matches the input sentence or an example sentence candidate, and extract and output its translation.

Figure 3:
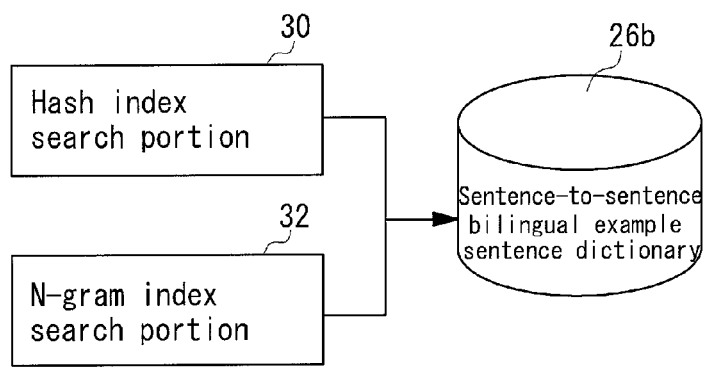
FIG. 3 illustrates a configuration of a search dictionary in a first language (second language) of a translation memory device.

FIG. 3 is a block diagram illustrating a configuration of a first language or second language search dictionary. When an input sentence in a first language is inputted, a hash index search portion 30 generates a hash value of the input sentence, and searches for a hash value of a example sentence that completely matches the hash value of the input sentence in the first language from the bilingual example sentence dictionary 26b, and extracts translation of an example sentence. In a case where the example sentence that completely matches the input sentence is not found by the hash index search portion 30, an N-gram index search portion 32 generates an N-gram from the input sentence, and searches for a similar example sentence candidate in the first language from the bilingual example sentence dictionary 26b using a generated N-gram character string, and extracts translation of the example sentence candidate.

As described later, for a further speedup and storage space saving, in generating a Bi-gram (2-gram), an ignoring character list may be used to remove an n-gram that contains a character that has high probability of occurrence in every example sentence. In addition, by using an ignoring Bi-gram list, a Bi-gram that has high probability of occurrence in every example sentence may be removed. In a case where an input sentence in a second language is inputted, these processes may be performed similarly to those in the case of the first language.

Figure 4:
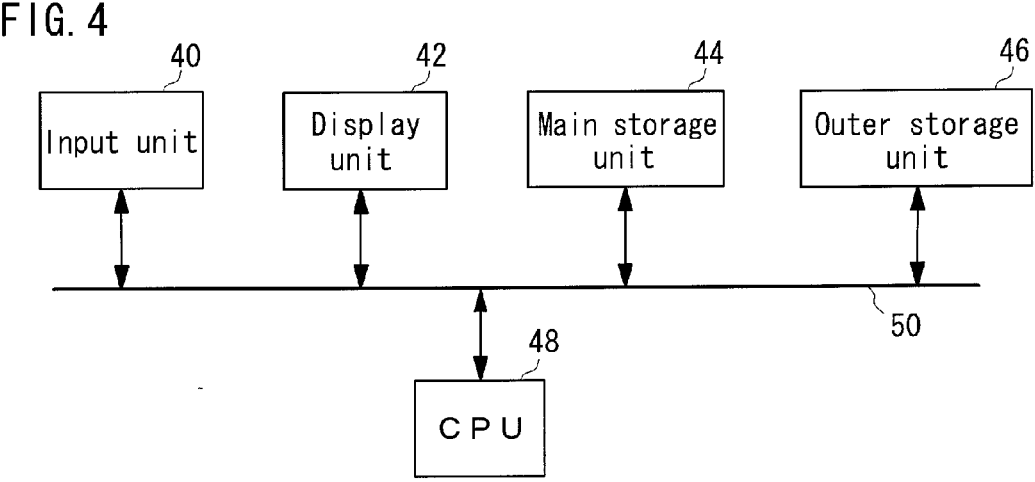
FIG. 4 illustrates a hardware configuration of a translation memory device.

FIG. 4 illustrates a hardware configuration of a translation memory device. The translation memory device includes an input unit 40, a display unit 42, a main storage unit 44, an outer storage unit 46, a central processing unit (CPU) 48, and a bus 50 that connects these units. The input unit 40 may include an optical reader or the like that may provide a user interface or optically read a word printed in a text. The display unit 42 may include a display or the like that displays a text sentence in an original language or a translation result. The main storage unit 44 may include a ROM or RAM to store a program for controlling a translating operation or data that contains an operation result or the like. The outer storage unit 46 may include a mass storage device such as a hard disk, and may store the bilingual example sentence dictionary 26b therein. The CPU 48 may control a translation operation based on a program that is stored in the main storage unit 44.

Figure 5:
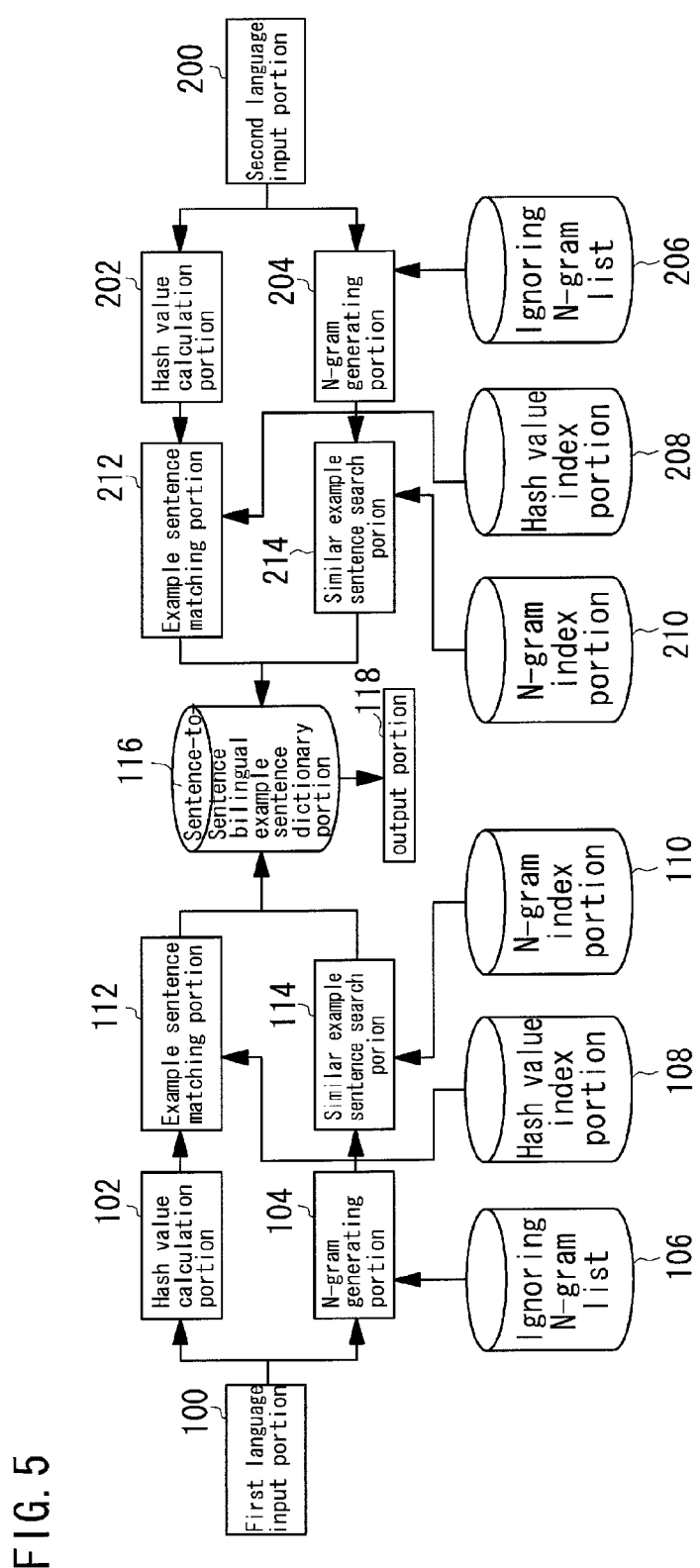
FIG. 5 is a functional block diagram of a translation memory device according to an example.

FIG. 5 is a functional block diagram of a translation memory device of an example. A translation memory device according to an example includes a first language input portion 100 that inputs an input sentence in a first language; a hash value calculation portion 102 that receives the input sentence from the first language input portion 100, and calculates a hash value of the input sentence; an N-gram generating portion 104 that receives the input sentence from the first language input portion 100, and generates an N-gram character string of the input sentence; an ignoring N-gram list 106 that stores ignoring N-grams in the first language; a hash value index portion 108 that stores hash values for plural example sentences in the first language; an N-gram index portion 110 that stores an example sentence in the first language in an N-gram TRIE structure; an example sentence matching portion 112 that compares the hash value of the input sentence calculated in the hash value calculation portion 102 with the hash values of the example sentences stored in the hash value index portion 108, and searches for an example sentence that matches the input sentence; a similar example sentence search portion 114 that searches for a similar example sentence candidate from the N-gram index portion 110 based on the N-gram character string of the input sentence generated by the N-gram generating portion 104, when the matching in example sentence matching portion 112 has failed; a bilingual example sentence dictionary 116 that stores example sentences in the first language and example sentences in a second language being translation of the example sentence, and extracts a example sentence or a example sentence candidate in the second language that is translation of the example sentence searched in the example sentence matching portion 112 or the example sentence candidate searched in the similar example sentence search portion 114; and an output portion 118 that outputs the example sentence extracted by the bilingual example sentence dictionary portion 116 to a display, printer, or the like.

The translation memory device includes a second language input portion 200, a hash value calculation portion 202 that calculates a hash value of an input sentence in the second language, an N-gram generating portion 204 that generates an N-gram character string of the input sentence in the second language, an ignoring N-gram list 206 that stores ignoring N-grams in the second language, a hash value index portion 208 that stores hash values for plural example sentences in the second language, an N-gram index portion 210 that stores an example sentence in the second language in an N-gram TRIE structure, an example sentence matching portion 212 that searches for an example sentence in the second language that matches the input sentence in the second language, and a similar example sentence search portion 214 that searches for a similar example sentence candidate in the second language from the N-gram index portion 210 based on the N-gram character string of the input sentence in the second language, when matching in the example sentence matching portion 212 has failed. For the input sentence in the second language, search processes similar to those performed for the first language is performed, and an example sentence in the first language being translation of the input sentence is outputted.

The first language or second language input portions 100 or 200 inputs a sentence of a document in the first language or second language to be translated from outside. The input sentence may be inputted by using an OCR, or by electrical information stored in a medium.

The example sentence hash value calculation portion 102 and 202 of the first language or second language calculates the hash value of the input sentence. The calculation of the hash value is performed as follows. If the input sentence is S and a character contained in the input sentence is Ci (i=1, 2, . . . n; n is natural number), then the input sentence can be expressed as S=C1 C2 . . . Cn, and the hash value of the input sentence S can be expressed as Hash(S) Default value of Hash(S) is 0, and Hash(S) can be calculated by a formula shown in FIG. 6. In FIG. 6, "or" means an or operation per bit, "and" means an and operation per bit, "A<<(m)" means A is shifted to the left by m bits, and "mod" operation means a modulo operation. L is the length of the Hash index table (the number of example sentence pairs). 11101101<<4 indicates an example where they are shifted to the left by 4 bits and becomes 11010000. Of course, the hash value of the input sentence may be calculated by a method other than the method described above.

Figure 7:
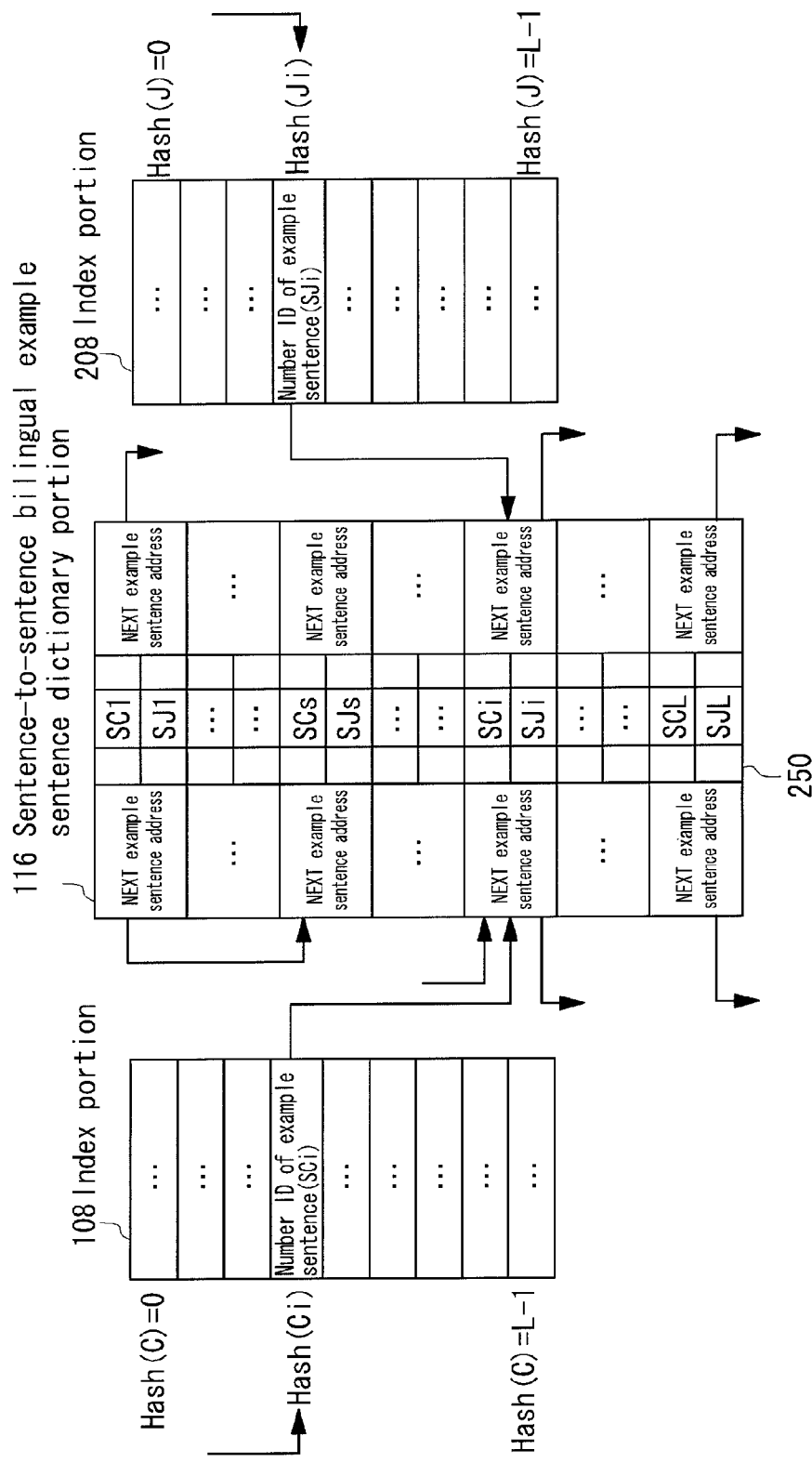
FIG. 7 shows the relation between a bilingual example sentence dictionary and hash value index portions.

Each of the hash index portions 108 and 208 of the first language or second language stores hash values of example sentences and addresses of the bilingual example sentence dictionary that stores the example sentences and translation of the example sentences. Based on the address, each of the example sentence matching portions 112 and 212 searches for translation of an example sentence. FIG. 7 shows the relation between a bilingual example sentence dictionary and hash index portions.

The hash index portion 108 of the first language includes plural records that store hash values (Hash(C)=0 to Hash(C)=L−1) for all example sentences in the first language stored in the bilingual example sentence dictionary, and addresses at which the example sentences are stored, for the purpose of identifying an example sentence that corresponds to a hash value. Similarly, the hash index portion 208 of the second language includes plural records that store hash values (Hash(J)=0~Hash(J)=L−1) for all example sentences in the second language, and addresses to identify an example sentence that corresponds to a hash value.

The bilingual example sentence dictionary portion 116 stores pairs of an example sentence in the first language and an example sentence in the second language, (SC1, SJ1), (SC2, SJ2), . . . , (SCL, SJL). SCi (i=1, 2, . . . , L) represents an example sentence in the first language (translation of the sentence SJi in the second language), and SJi (i=1, 2, . . . , L) represents translation of the sentence SCi (example sentence in the first language) in the second language. To each of the example sentence pairs, a corresponding address is provided, respectively. The plural example sentences having a same hash value are linked by a Next example sentence address. In addition, to each of the example sentence pairs, a count region 250 for the number of the N-gram is assigned, which is used when a similar example sentence is searched for as described later.

Figure 8:
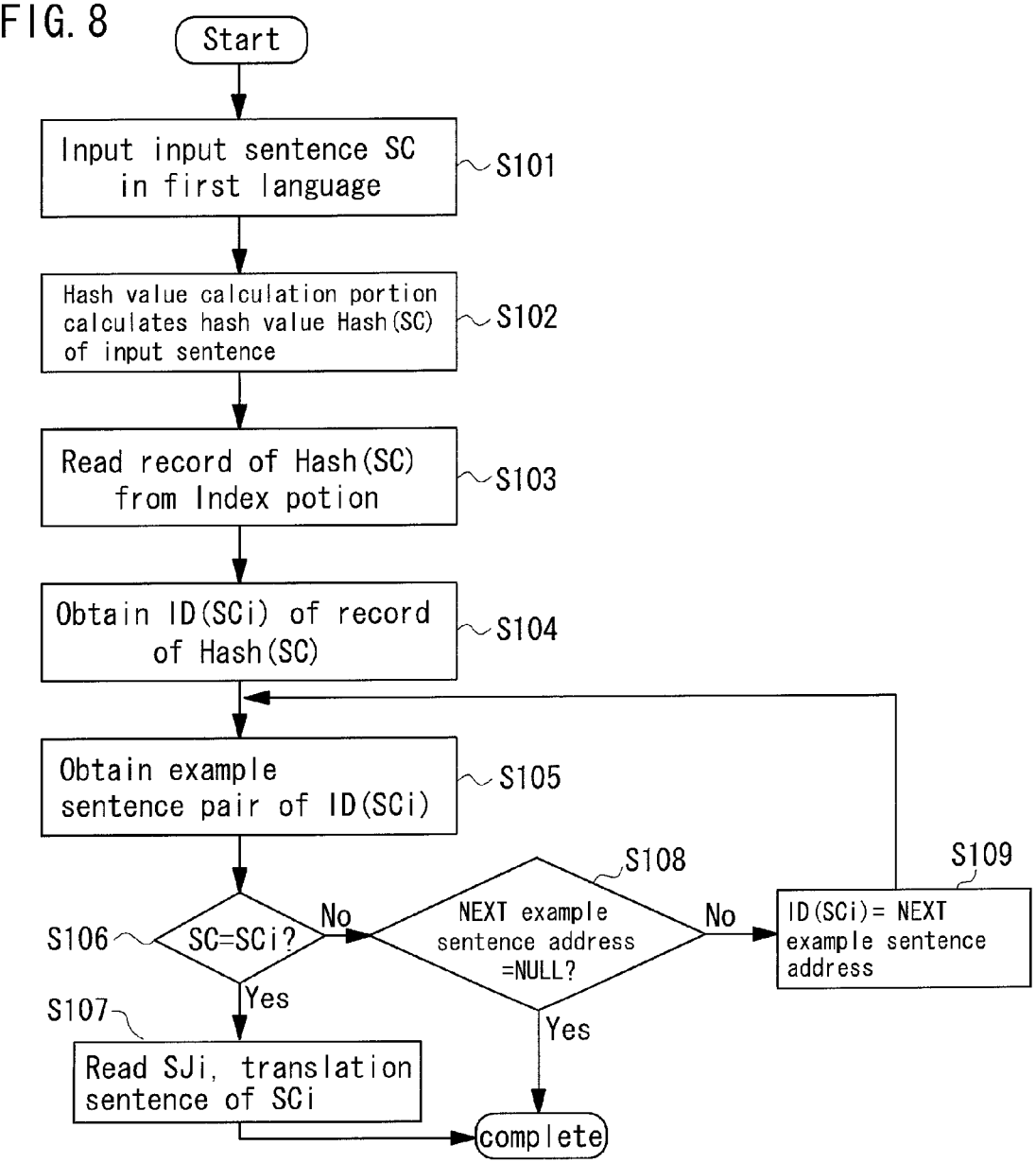
FIG. 8 is a flowchart illustrating an operation of searching for an example sentence that matches an input sentence according to an example.

Referring now to a flowchart of FIG. 8, an operation of searching for an example sentence that matches an input sentence will be described. The search of the input sentence in a first language is now explained. When an input sentence SC in the first language is inputted from the first language input portion 100 (step S101), the hash value calculation portion 102 calculates a hash value Hash(SC) of the input sentence SC by the calculation method described above (step S102). The calculated hash value Hash(SC) is provided to the example sentence matching portion 112. The example sentence matching portion 112 searches for a record that matches the Hash(SC) from the index portion 108, and reads the record (step S103). Then the example sentence matching portion 112 obtains an address that is an identification information of the example sentence stored in the record (step S104), and reads an example sentence pair stored in the bilingual example sentence dictionary portion 116, based on the address (step S105).

The example sentence matching portion 112 compares the example sentence SCi in the first language included in the example sentence pair and the input sentence SC, and determines whether or not the example sentence SCi and the input sentence SC is same (step S106). If the example sentence SCi and the input sentence SC is same, the example sentence matching portion 112 outputs an example sentence SCj in the second language, which is translation of the example sentence SCi, from the output portion 118 (Step S107). On the other hand, if the example sentence SCi and the input sentence SC is not same, the example sentence matching portion 112 determines whether or not the address of a NEXT example sentence in the first language is Null (step S108). If the address is Null, that means that the example sentence that matches the hash value (SC) of the input sentence does not exist, and the search completes. If the NEXT address exists, then the example sentence matching portion 112 obtains the NEXT address (step S109), and reads the example sentence pair of the NEXT address (step S105), and comparison with the input sentence is repeated.

In a case where an input sentence in the second language is inputted, similarly to the input sentence in the first language, a record of a matching hash value is read from the hash index portion 208, and a example sentence in the second language is searched for by the address stored in the record, and an example sentence in the first language that is translation of the example sentence is outputted.

When the example sentence that has a hash value that matches the hash value of the input sentence does not exist, the similar example sentence search portions 114 and 214 search for a similar example sentence using an N-gram character string of the input sentence. The N-gram generating portions 104 and 204 that generate an N-gram character string from the input sentence will be now described. The N-gram index portions 110 and 210 store all N-grams, which are contained in the example sentence of the bilingual example sentence dictionary portion, in a TRIE structure, as shown in FIG. 9. In the N-gram TRIE structure, one node stores one character, and N-gram is specified by the nodes that exist from leaves to the root. A node includes a node ID, character information (character C), a flag, a pointer to an example sentence number list record when the flag is 1, a node ID of the parent node, and a node ID of left sibling node. The node ID of each node of the TRIE is provided in a search order of depth-first search. The character information is one character, and uses Unicode. However, in consideration of search speed, each node at the first level of the search TRIE may store high byte of the first character of a word, and each node at the second level may store low byte of the first character of a word. The root is 0th level. The node IDs of the leftmost child is the current node ID+1, and sibling nodes are arranged in ascending order of character information values from left to right. Flag 0 means that the node is an internal node, and flag 1 means that the nodes that exist in a path from the root to the node are N-gram.

An N-gram is a character string made up of N characters. If the input sentence S=C1 C2 . . . Cn Cn+1 . . . Cm, then its N-gram character string can be expressed as follows: (C1 C2 . . . Cn), (C2 C3 . . . Cn+1), (C3 C4 . . . Cn+2) . . . (Ck Ck+1 . . . Cn+k−1). In the TRIE structure according to this example, the flag of the node ID is 1. This means that an example sentence number list is associated with the leaf of the node ID. The example sentence number list includes plural records of pairs each of which is made up of a number that identifies an example sentence that contains an N-gram "character i . . . character j", and a pointer that refers to a next example sentence number list that contains the N-gram "character i . . . character j". In other words, the example sentence number list is a set of records of information that identifies example sentences that contain characters that are specified by the nodes from the leaves to the root.

For example, when the N-gram index portion is a Bi-gram TRIE structure, as shown in FIG. 10, the nodes from the leaves to the root store the Bi-gram character strings of (C11, C21) (C11, C22), (C12, C23), . . . , (C1*m*, C2*c*), (C1*m*, C2*t*). An example sentence number list is associated with each of the Bi-gram leaf. The example sentence number list associated with (C11, C21) includes records 260, 262, . . . , 270. The record 260 stores a number S010 that identifies an example sentence that contains (C11, C21) and a pointer P1 that refers to the record 262. The record 262 stores a number S015 that identifies a next example sentence that contains (C11, C21) and a pointer P2 that refers to a next record. In the last record 270, a number S020 that identifies the last example sentence and a pointer that is Null are stored. As such, all example sentences that contain (C11, C21) are specified by the example sentence number list. In a similar way, example sentence number lists are provided for other Bi-grams, respectively.

Referring now to a flowchart of FIG. 11, an operation of a similar example sentence search portion will be described. It is assumed that an input sentence in a first language is inputted. From the input portion 100, an input sentence SC in the first language is inputted (step S201). If matching of an example sentence cannot be obtained by a hash value, the input sentence SC is inputted to the N-gram generating portion 104, and the N-gram generating portion 104 generates N-gram strings of the input sentence SC (C1C2C3, . . . , C2C3C4 . . . , . . . , Ch . . . Cn; h N-grams) (step S202). In this step, the N-gram generating portion 104 refers to the first language ignoring N-gram list 106 in which ignoring N-grams are previously stored, and excludes any N-gram that matches the N-gram stored in the list. The ignoring N-gram list is built by using a statistical approach and artificial approach. By excluding the N-gram that less contributes to the search of a similar example sentence, efficiency and processing speed in searching for similar example sentences can be improved.

The N-gram character string generated by the N-gram generating portion 104 is provided to the similar example sentence search portion 114. The similar example sentence search portion 114 performs a processing of Num(ID)=0, Sim(ID)=0 for all example sentence IDs, as an initial operation (step S203). Num(ID) represents the number of N-grams that the example sentence contains, and Sim(ID) represents the similarity of the example sentence.

When the number of the N-grams of the input sentence SC is h, the similar example sentence search portion 114 searches for an example sentence that contains the N-grams, from i=1 to i=h. In other words, the similar example sentence search portion 114 refers to the N-gram index portion 110, and searches for an N-gram (CiCi+1 . . . Ck) from the N-gram TRIE structure (step S204). If any matching N-gram (CiCi+1 . . . Ck) is found in the N-gram TRIE structure (step S205), the similar example sentence search portion 114 obtains all example sentence IDs (ID1, ID2, . . . ) that contain (CiCi+1 . . . Ck) from the example sentence number list, using the "pointer to an example sentence number list record" in a node that stores the character Ck (step S206). By this step, a processing of Num(ID1)=Num(ID1)+1; Num(ID2)=Num(ID2)+1; . . . is performed, and "1" is added to the number of the matching N-gram for each of example sentences. Preferably, the added number of the Num(ID) is written to the count region 250 that corresponds to each of the example sentences in the bilingual example sentence dictionary.

When the addition of the number of the matching N-gram is completed, and when the N-gram (CiCi+1 . . . Ck) is not found in the N-gram TRIE structure, the similar example sentence search portion 114 performs a processing of i=i+1 (step S207), and searches for a next N-gram of the input sentence SC from the N-gram TRIE structure (step S204). When the next N-gram is searched for through similar steps described above, "1" is added to the number of the matching N-gram of a corresponding example sentence. Such processing is repeated i=h times, that is, as much times as the number of character strings of the N-gram generated from the input sentence SC.

When the search of the N-gram of the input sentence is completed, the number of the N-gram is retained in the count region 250 of the example sentence in the bilingual example sentence dictionary portion, as shown in FIG. 12. The similar example sentence search portion 114 performs a calculation, Sim(IDj)=Num(IDj)/n, for all example sentences of Num (IDj)>0, whose number of the N-gram in the count region 250 is equal to or greater than 1 (step S208). The value of n determines the threshold of the similarity, Sim(IDj).

The similar example sentence search portion 114 reads IDjth example sentence pair information (SCj, SJj) from the bilingual example sentence dictionary portion 116 for all example sentences of Sim(IDj)>threshold. According to the information, the output portion 118 outputs an example sentence candidate that is similar to the input sentence SC and translation of the candidate (SCj, SJj) (step S209).

The calculation of the similarity Sim(IDj) described above is an example and not necessarily limited to this example. For example, for all example sentences of Num(IDj)>0, a calculation of Sim(IDj)=2*Num(IDj)/(NumBG(SCj)+NumBG (SJj)) may be performed. NumBG(SC) represents the number of N-gram of the input sentence SC.

Figure 11:
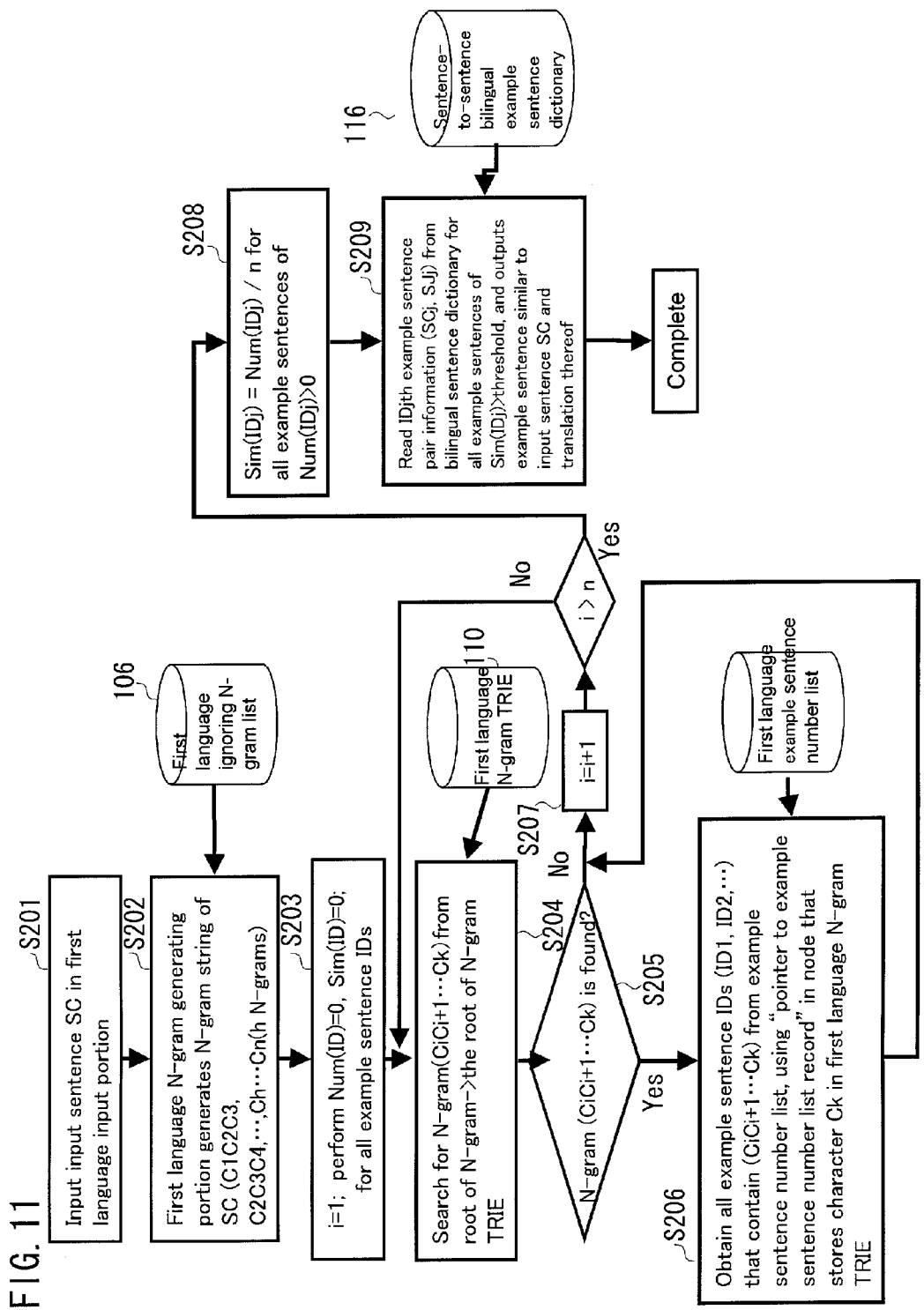
FIG. 11 is a flowchart illustrating an operation of a similar example sentence search portion.

Although FIG. 11 and FIG. 12 show examples of searching for a similar example sentence for the input sentence in the first language, search processes are performed also for an input sentence in a second language, similarly.

Figure 13:
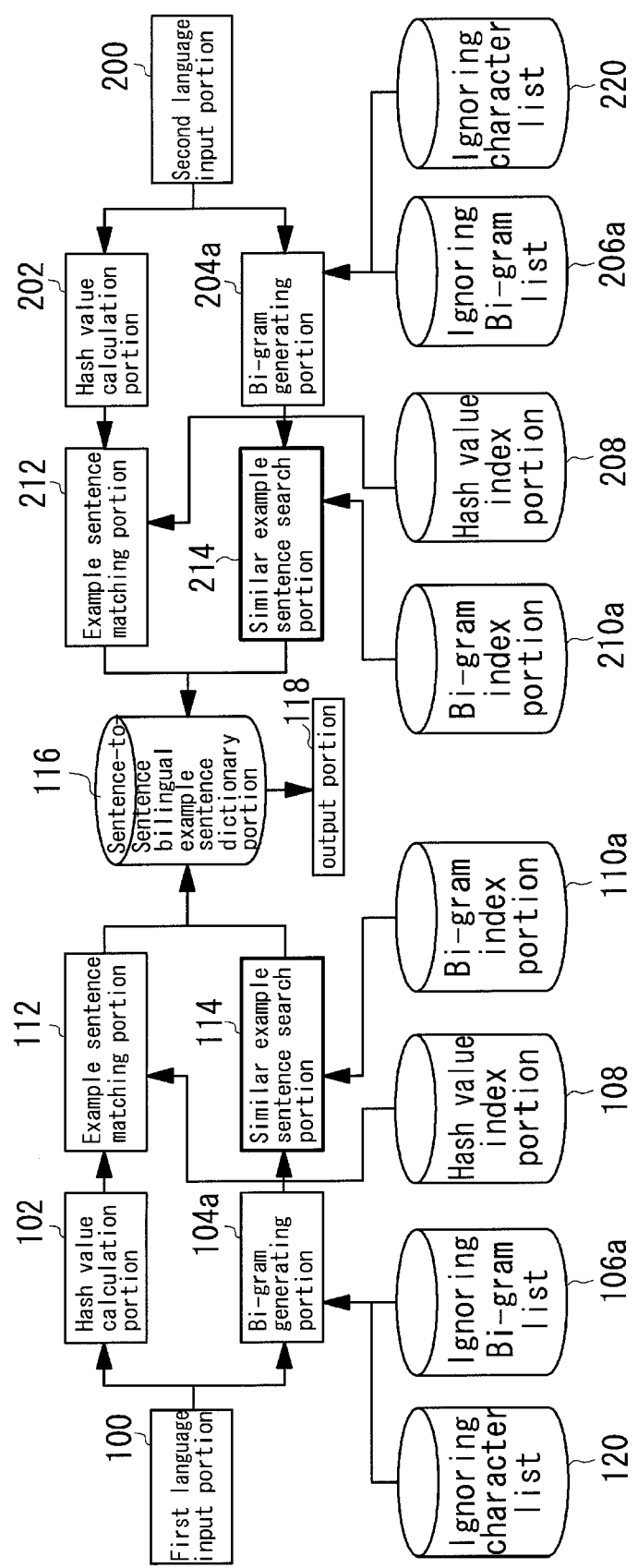
FIG. 13 is a functional block diagram of a translation memory by a Bi-gram index method.

FIG. 13 is a block diagram of a translation memory configured using a Bi-gram index method according to an example. The configuration shown in FIG. 13 is basically similar to the configuration shown in FIG. 5, excepting that ignoring character lists 120 and 220 of a first language and second language are added. For the blocks in which N-gram is changed to Bi-gram, "a" is added after their reference numerals.

Figure 14:
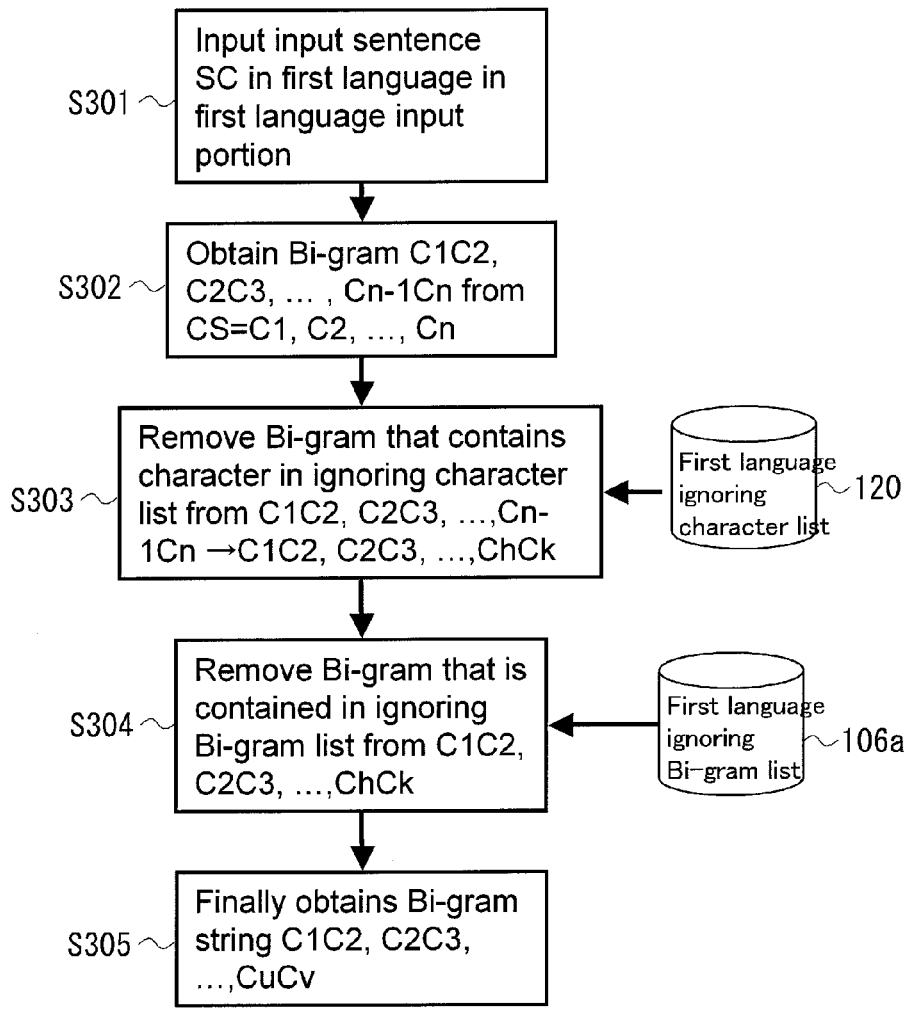
FIG. 14 is a flowchart illustrating an operation of a Bi-gram generating portion.

When an example sentence that matches an input sentence CS in a first language is not found, an example sentence that is similar to the input sentence CS is searched for. The search is performed by a Bi-gram index method. Referring to FIG. 14, an operation of a Bi-gram generating portion 104a will be now described. The input sentence CS in the first language is inputted in the first language input portion 100 (step S301), and then the Bi-gram generating portion 104a obtains Bi-gram strings C1C2, C2C3, . . . , Cn−1Cn from the input sentence CS=C1 C2 . . . Cn (step S302).

Then, the Bi-gram generating portion 104a refers to the ignoring character list 120, and removes any Bi-gram that contains a character in the ignoring character list from the Bi-gram strings C1C2, C2C3, . . . , Cn−1Cn, and obtains Bi-gram character strings C1C2, C2C3, . . . , ChCk (step S303). In addition, the Bi-gram generating portion 104a refers to an ignoring Bi-gram list 106a, and removes any Bi-gram that is contained in the ignoring Bi-gram list from the Bi-gram character strings C1C2, C2C3, . . . , ChCk (step S304), and finally obtains Bi-gram strings C1C2, C2C3, . . . , CuCv (step S305). Subsequent processing may be performed in a similar way to in the case of N-gram, and an example sentence candidate in the first language that is similar to the input sentence in the first language and translation of the candidate are outputted. In a case where Bi-grams are generated from an input sentence in a second language, processes may be performed similarly to those in the case of the first language.

Now, a second example of the present invention will be described. Although in the example described above, Bi-gram is searched for by using a Bi-gram TRIE structure of a Bi-gram index portion 11a, a Bi-gram index portion according to the second example searches for a Bi-gram string generated from the input sentence, without using a TRIE structure.

Figure 15:
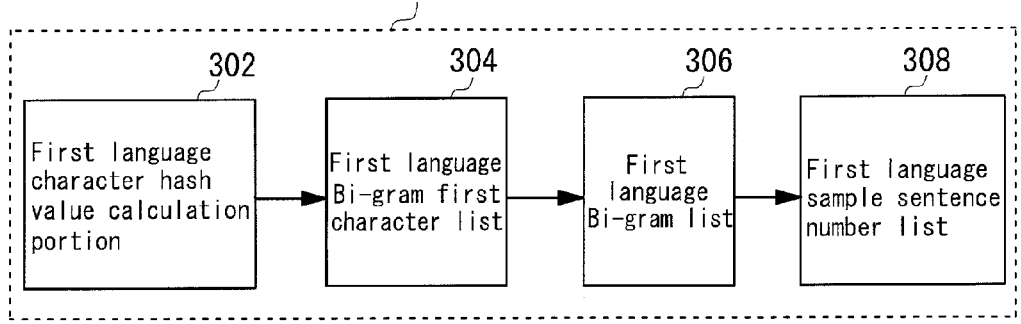
FIG. 15 illustrates a configuration of a Bi-gram index portion according to a second example.

FIG. 15 illustrates a configuration of a Bi-gram index portion for a first language. A Bi-gram index portion 300 includes a first language character hash value calculation portion 302, a first language Bi-gram first character list 304, a first language Bi-gram list 306, and a first language example sentence number list 308. Although not shown, a Bi-gram index portion for a second language may be configured similarly.

The character hash value calculation portion 302 is a function that transforms all character codes of the first language or second language into sequential codes. As shown in FIG. 16, the Bi-gram first character list 304 includes a Bi-gram first character, i.e., first character 0, 1, . . . i, and a pointer to a Bi-gram list. As shown in FIG. 17, the Bi-gram list 306 includes a Bi-gram second character, a pointer to a number list of an example sentence that contains Bi-gram "character i character j", and a pointer to a Bi-gram list of a next Bi-gram "character i character h". As shown in FIG. 18, the example sentence number list 308 includes a number of an example sentence that contains a Bi-gram "character i character j", and a pointer to a number list record of an example sentence that contains a next same Bi-gram.

Figure 19:
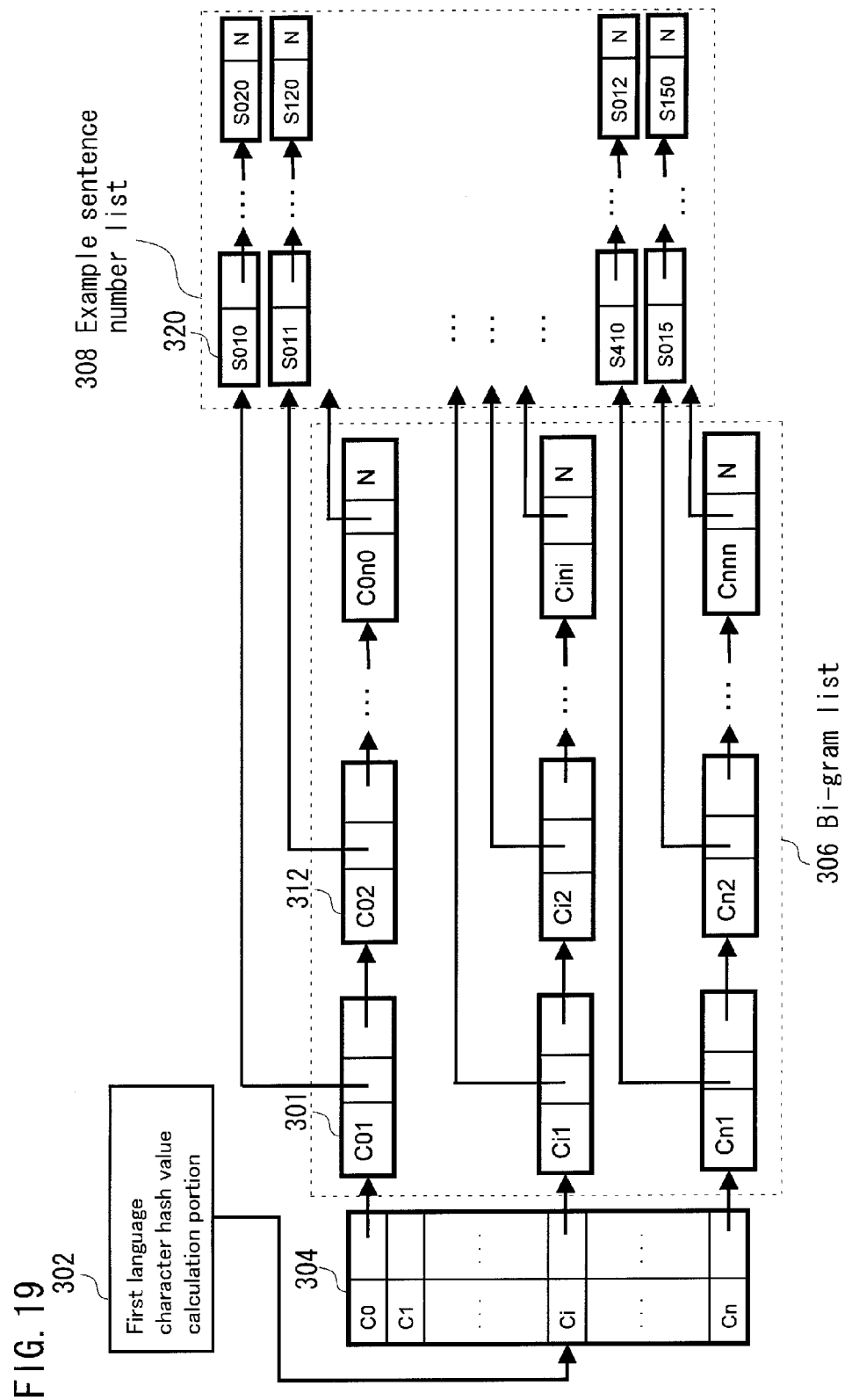
FIG. 19 illustrates an operation of a Bi-gram index portion according to a second example.

FIG. 19 illustrates details of the Bi-gram index portion shown in FIG. 18. For example, if the hash value calculated by the first language character hash value calculation portion 302 matches the first character C0 in the Bi-gram first character list 304, a corresponding pointer of the first character C0 searches for a record 310 in the Bi-gram list 306. Stored in the record 310 are; a Bi-gram second character C01, a number that identifies an example sentence that corresponds to the Bi-gram characters C0 and C01, and a pointer that refers to a next record 312. Stored in the record 312 are; a Bi-gram second character C02, a number that identifies an example sentence that corresponds to the Bi-gram characters C0 and C02, and a pointer that refers to a next record. In a record 320 in the example sentence number list 308 that is referred to by the record 310, an example sentence number S010 that corresponds to the Bi-gram characters C0 and C01, and a pointer to a record of a next example sentence number that contains the Bi-gram characters C0 and C01 are stored. The configuration of a Bi-gram index for a second language may be configured similarly.

Figure 20:
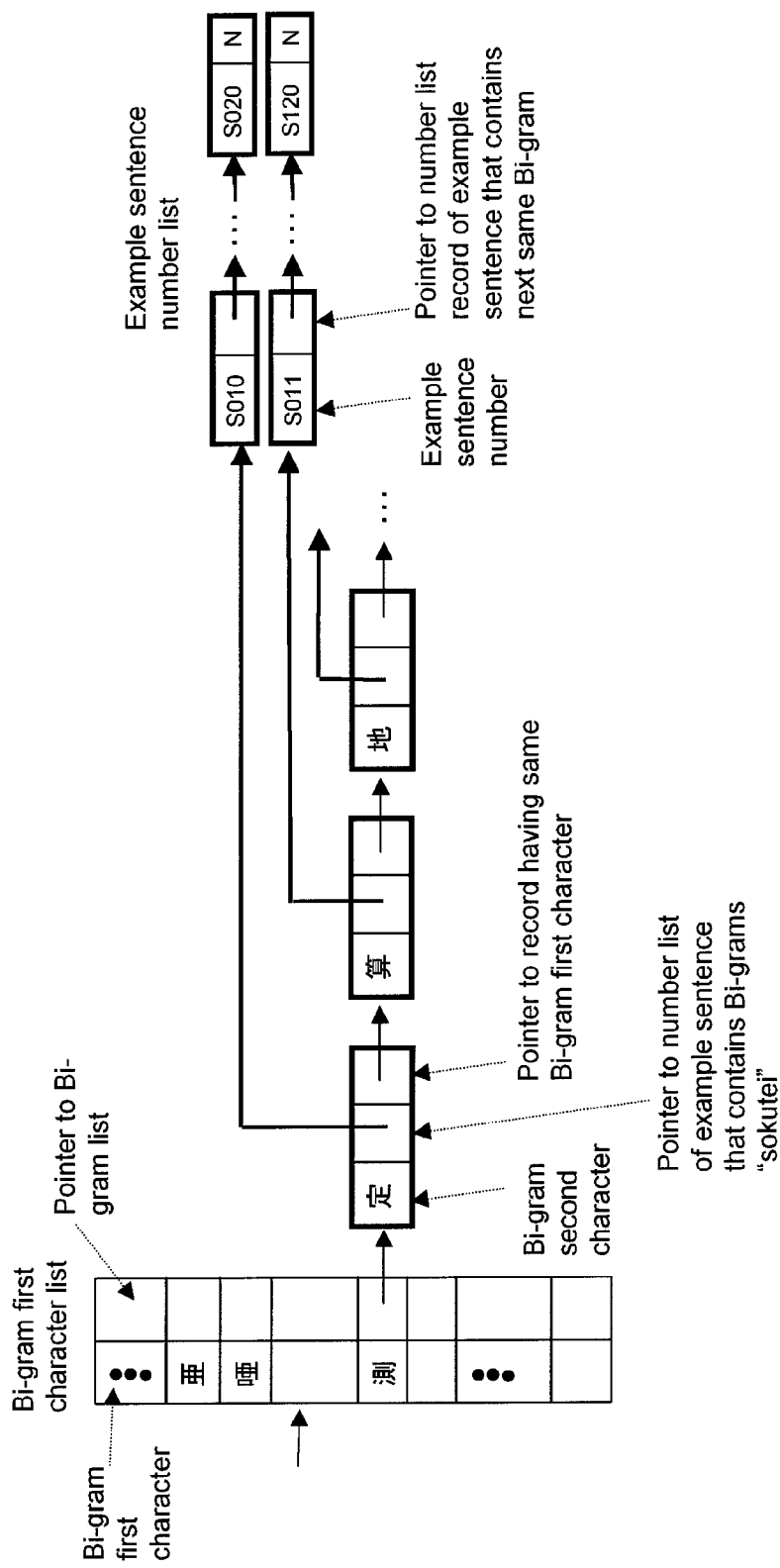
FIG. 20 illustrates a specific operation of a Bi-gram index portion according to a second example.

FIG. 20 illustrates an example of searching for a Bi-gram index. For example, when "soku" is specified from the Bi-gram first character list by the hash value calculation portion, a pointer of the "soku" refers to a record in a Bi-gram list. In FIG. 20, as a second character that follows "soku", "tei", "san", and "chi" are shown. An example sentence that contains these Bi-grams, "sokutei", "sokusan", "sokuchi" is referred to by pointers to example sentence number lists.

Figure 21:
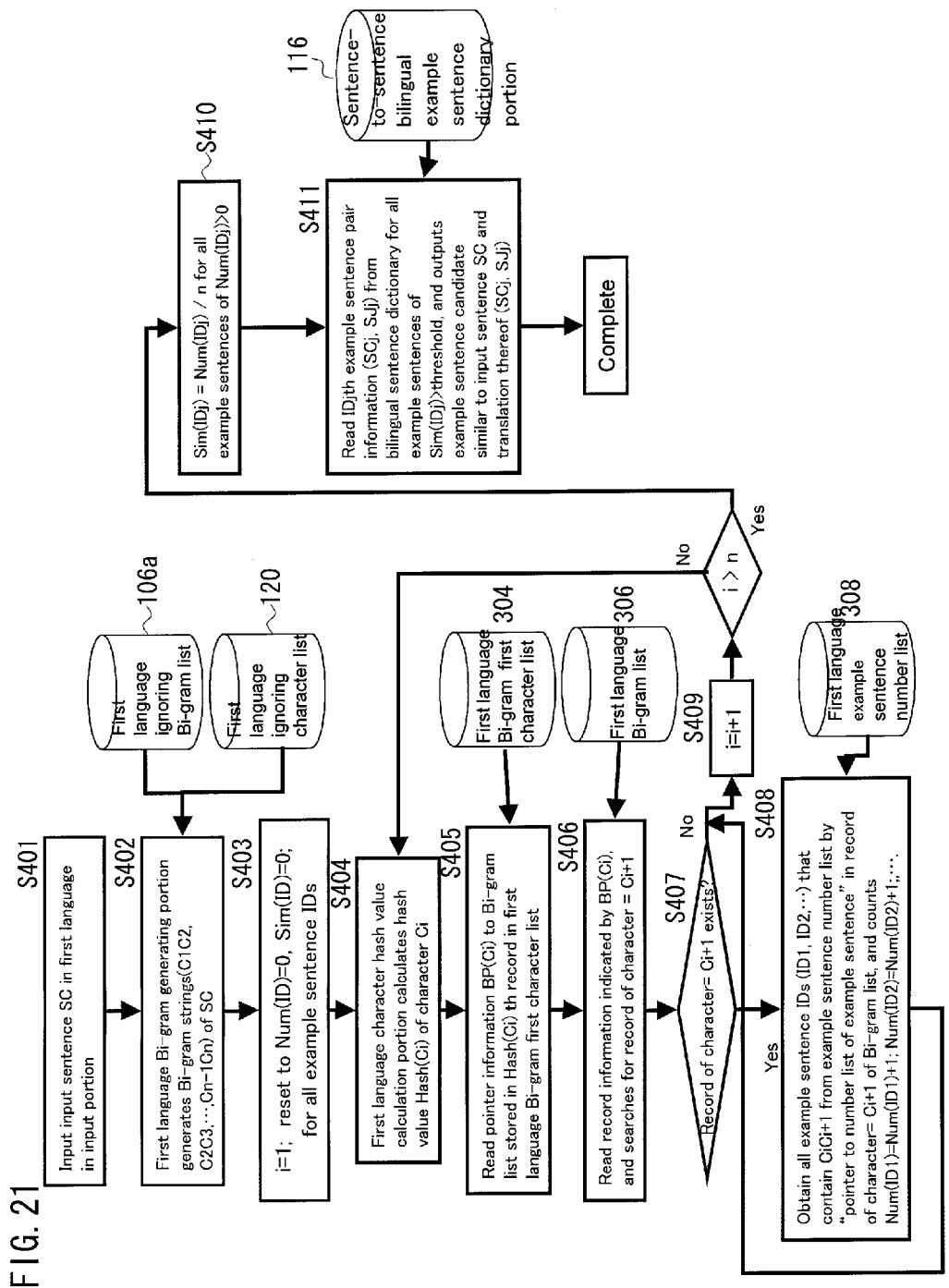
FIG. 21 is a flowchart illustrating a search operation of a similar example sentence search portion according to a second example.

Referring now to FIG. 21, an operational flow of a similar example sentence search operation of a second example will be described. The operation is performed when an input sentence in a first language is inputted, and an example sentence that matches the input sentence is not found. An input sentence SC in the first language is inputted in the input portion 100 (step S401). The Bi-gram generating portion 104a generates Bi-gram strings (C1C2, C2C3, ..., Cn−1Cn) of the input sentence SC (step S402). In this step, the Bi-gram generating portion 104a refers to the ignoring Bi-gram list 106a and the ignoring character list 120, and removes a character or character string that is contained in these lists from the Bi-gram string.

When the Bi-gram strings of the input sentence SC are generated, the similar example sentence search portion 114 initializes Num(ID), Sim(ID), and resets to Num(ID)=0, Sim(ID)=0 for all example sentence IDs (step S403). It also sets as i=1 in order to perform a routine search processing as much times as the number of Bi-gram strings contained in the input sentence SC.

Then, the similar example sentence search portion 114 lets the character hash value calculation portion 302 of the Bi-gram index portion 110a calculate the hash value of a character Ci, Hash(Ci) (step S404). Next, the similar example sentence search portion 114 refers to the first language Bi-gram first character list 304, and reads pointer information BP(Ci) to the Bi-gram list 306 stored in a Hash(Ci)th record (step S405).

Then, the similar example sentence search portion 114 reads record information indicated by the pointer information BP(Ci), and searches for a record of the character=Ci+1 (step S406). The similar example sentence search portion 114 determines whether or not the record of the character=$C_{i+1}$ exists (step S407). In a case where the record of the character=$C_{i+1}$ exists, the similar example sentence search portion 114 refers to a "pointer to a number list of an example sentence" stored in the record of the character=$C_{i+1}$ in the Bi-gram list 306, and obtains all example sentence IDs (ID1, ID2, ...) that contain the Bi-gram string Ci $C_{i+1}$ from the first language example sentence number list 308, and counts Num (ID1)=Num(ID1)+1; Num(ID2)=Num(ID2)+1; ... (step S408). The counting result may be stored in the similar example sentence search portion 114, or the counting value may be written in a region that corresponds to an example sentence of the bilingual example sentence dictionary portion 116.

When the counting is completed, and in a case where the record of the character=$C_{i+1}$ does not exist, a processing of i=i+1 is performed (step S409), and then the character hash value calculation portion 302 continues calculation and search of a hash value of a first character of a next Bi-gram string (step S404). As such, for each of all Bi-gram strings generated from the input sentence SC, an example sentence that contains these Bi-gram strings is searched for, and the counting result of the contained number of the Bi-gram strings is retained.

When the search of the Bi-grams of the input sentence SC is completed, the similar example sentence search portion 114 performs a calculation of Sim(IDj)=Num(IDj)/n for all example sentences of Num(IDj)>0 in which the number of the Bi-gram is equal to or greater than 1 (step S410). The value of n determines the threshold of the similarity, Sim(IDj). Then, the similar example sentence search portion 114 reads IDjth example sentence pair information (SCj, SJj) from the bilingual example sentence dictionary portion 116 for all example sentences of Sim(IDj)>threshold. According to the information, the output portion 118 outputs an example sentence candidate that is similar to the input sentence SC and translation of the candidate (SCj, SJj) (step S411). A search operation for an input sentence in a second language may be performed similarly to that of the first language.

The method for calculating the similarity is not limited to the example described above. For example, for all example sentences of Num (IDj)>0, the calculation by Sim (IDj)= 2*Num(IDj)/(NumBG(SCj)+NumBG(SJj)) may be performed. NumBG(SC) represents the number of the N-grams of the input sentence SC.

Figure 22:
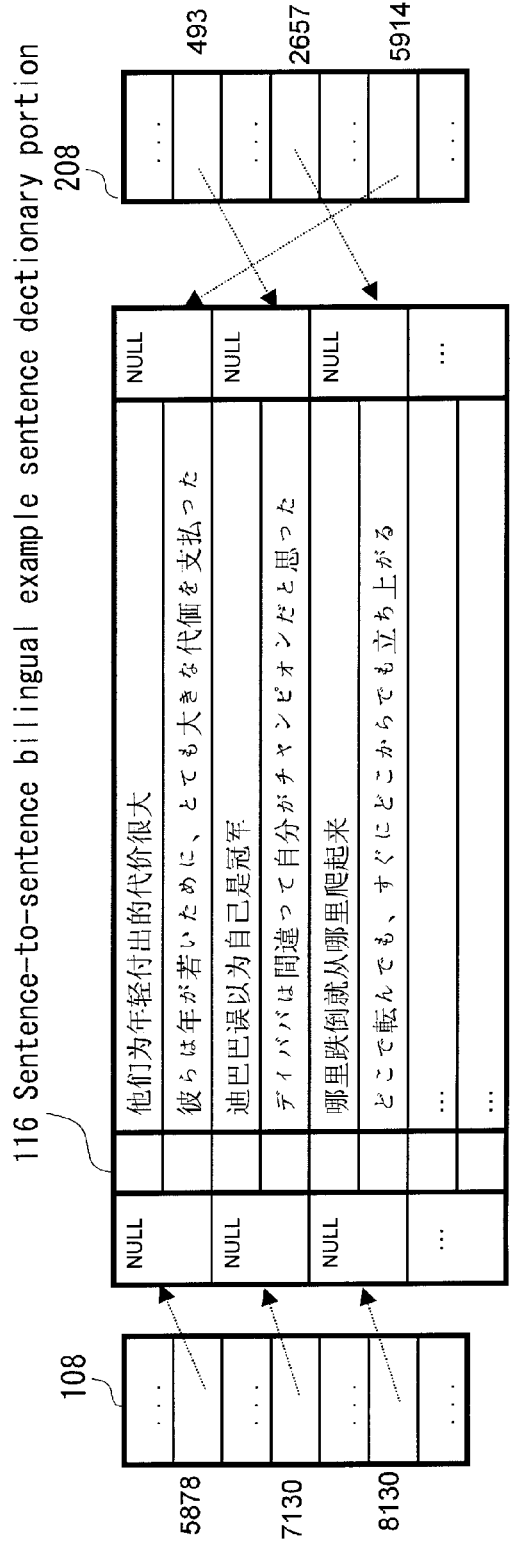
FIG. 22 illustrates a specific translation example generated by a translation memory device according to an example of the present invention.

FIG. 22 illustrates a specific translation example. SC1 represents an input sentence in Chinese, and SJ1 represents an example sentence in Japanese being translation of the Chinese sentence. Similarly, SC2 and SJ2, SC3 and SJ3 are example sentence pairs, respectively. Hash(SC1), Hash(SC2), Hash(SC3) are hash values of the example sentences in Chinese, respectively, and Hash(SJ1), Hash(SJ2), Hash(SJ3) are hash values of the example sentences in Japanese, respectively.

When the example sentence SC1 in Chinese is inputted in the translation memory device shown in FIG. 5, a hash value 5878 is calculated by the hash value calculation portion 102. The example sentence matching portion 112 refers to the hash index portion 108, and searches for a record that matches the hash value 5878. In a case where a matching record exists, the example sentence matching portion 112 refers to a pointer (address) stored in the record, and refers to an example sentence in Chinese in the bilingual example sentence dictionary portion 116, and outputs an example sentence SJ1 in Japanese that is corresponding translation of the Chinese sentence. When other example sentences SC2, SC3 in Chinese are inputted, similar processing will be performed.

On the other hand, when an example sentence SJ1 in Japanese is inputted, a hash value 5914 is calculated by the hash value calculation portion 202. The example sentence matching portion 212 refers to the hash index portion 208, and searches for a record that matches the hash value 5914. In a case where a matching record exists, the example sentence matching portion 212 refers to a pointer (address) stored in the record, and refers to an example sentence in Japanese in the bilingual example sentence dictionary portion 116, and outputs an example sentence SC1 in Chinese that is translation of the Japanese sentence. When other example sentences SJ2, SJ3 in Japanese are inputted, similar processing will be performed.

Although exemplary embodiments of the present invention have been described in detail, it should be understood that the embodiments are for illustrative purposes only and that various modifications or changes can be made therein without departing from the inventive scope which is defined in the appended claims.

A translation apparatus according to an aspect of the present invention may be used in a translation memory or translation system. Especially, it may be used for a translation assisting system using a translation memory that has a bilingual example sentence dictionary.

What is claimed is:

1. A translation apparatus comprising:
   a bilingual example sentence dictionary that stores a first plurality of example sentences in a first language and a second plurality of example sentences in a second language that are translations of the first plurality of example sentences;
   a hash value index portion that stores a first plurality of first hash values that are hash values of the first plurality of example sentences computed from encoding the first plurality of example sentences and applying a hash function to the encoded first plurality of example sentences;
   an N-gram index portion that stores an N-gram TRIE structure comprising a first plurality of N-gram strings, where N-is a natural number, that are N-gram strings of the first plurality of example sentences;
   an input unit that receives a first input sentence in the first language as an input;

a first search unit that generates a hash value of the first input sentence using the hash function, determines whether there exists a matching hash value among the first plurality of hash values that matches the hash value of the first input sentence, determines a first example sentence among the first plurality of example sentences having the matching first hash value, and determines whether the first example sentence matches the first input sentence;

a second search unit that generates an N-gram string of the first input sentence, counts a number of N-grams of the N-gram string of the first input sentence that match N-grams among each of the first plurality of N-gram strings, determines similarities between the first input sentence and candidate example sentences among the first plurality of example sentences based on the number of N-grams of the N-gram string of the first input sentence that match the N-grams among each of the first plurality of N-gram strings, and determines a first example sentence candidate among the candidate example sentences that most similarly matches the first input sentence based on the determined similarities, in response to the first search unit determining that the first example sentence does not exist; and an output unit that outputs one of a first translated sentence among the second plurality of example sentences in the second language that is a translation of the first example sentence determined by the first search unit and the first example sentence candidate determined by the second search unit.

2. The translation apparatus according to claim 1, wherein:
the hash value index portion stores a second plurality of second hash values that are second hash values of the second plurality of example sentences computed from encoding the second plurality of example sentences and applying the hash function to the encoded second plurality of example sentences, the N-gram index portion stores a second N-gram TRIE structure comprising a second plurality of N-gram strings that are N-gram strings of the second plurality of example sentences, in response to the input unit receiving a second input sentence in the second language, the first search unit generates a second hash value of the second input sentence using the hash function, determines whether there exists a second matching hash value among the second plurality of hash values that matches the second hash value of the second input sentence, determines a second example sentence among the second plurality of example sentences having the matching second hash value, and determines whether the second example sentence matches the second input sentence, the second search unit generates a second N-gram string of the second input sentence, counts a second number of N-grams of the N-gram string of the second input sentence that match N-grams among each of the second plurality of N-gram stings, determines similarities between the second input sentence and second candidate example sentences among the second plurality of example sentences based on the second number of N-grams of the N-gram string of the second input sentence that match the N-grams among each of the second plurality of N-gram strings, and determines a second example sentence candidate among the second candidate example sentences that most similarly matches the second input sentence based on the determined similarities, in response to the first search unit determining that the second example sentence does not exist; and the output unit outputs one of a second translated sentence among the first plurality of example sentences in the first language that is a translation of the second example sentence determined by the first search unit and the second example sentence candidate determined by the second search unit.

3. The translation apparatus according to claim 1, wherein, when the generated N-gram string matches a search ignoring N-gram that is previously provided, the second search unit removes the matched ignoring N-gram from the generated N-gram string.

4. The translation apparatus according to claim 1, wherein:
the second search unit generates a Bi-gram character string from the first input sentence; and
the N-gram index portion stores the first plurality of example sentences and the second plurality of example sentences in a Bi-gram TRIE structure.

5. A translation method using a bilingual example sentence dictionary that stores a first plurality of example sentences in a first language and a second plurality of example sentences in a second language that are translations of the first plurality of example sentences, the method comprising:

storing a first plurality of first hash values that are hash values of the first plurality of example sentences computed from encoding the first plurality of example sentences and applying a hash function to the encoded first plurality of example sentences;

storing an N-gram TRIE structure comprising a first plurality of N-gram strings, where N-is a natural number, that are N-gram strings of the first plurality of example sentences;

inputting a first input sentence in the first language;

generating a hash value of the first input sentence using the hash function, determining whether there exists a matching hash value among the first plurality of hash values that matches the hash value of the first input sentence, determining a first example sentence among the first plurality of example sentences having the matching first hash value, and determining whether the first example sentence matches the first input sentence;

generating an N-gram string of the first input sentence, counting a number of N-grams of the N-gram string of the first input sentence that match N-grams among each of the first plurality of N-gram strings, determining similarities between the first input sentence and candidate example sentences among the first plurality of example sentences based on the number of N-grams of the N-gram string of the first input sentence that match the N-grams among each of the first plurality of N-gram strings, and determining a first example sentence candidate among the candidate example sentences that most similarly matches the first input sentence based on the determined similarities, in response to determining that the first example sentence does not exist; and outputting one of a first translated sentence among the second plurality of example sentences in the second language that is a translation of the first example sentence and the first example sentence candidate.

6. The translation method according to claim 5, further comprising:
storing a second plurality of second hash values that are second hash values of the second plurality of example sentences computed from encoding the second plurality of example sentences and applying the hash function to the encoded second plurality of example sentences;

storing a second N-gram TRIE structure comprising a second plurality of N-gram strings that are N-gram strings of the second plurality of example sentences;

inputting a second input sentence in the second language;

generating a second hash value of the second input sentence using the hash function, determining whether there exists a second matching hash value among the second plurality of hash values that matches the second hash value of the second input sentence, determining a second example sentence among the second plurality of example sentences having the matching second hash value, and determining whether the second example sentence matches the second input sentence;

generating a second N-gram string of the second input sentence, counting a second number of N-grams of the N-gram string of the second input sentence that match N-grams among each of the second plurality of N-gram stings, determining similarities between the second input sentence and second candidate example sentences among the second plurality of example sentences based on the second number of N-grams of the N-gram string of the second input sentence that match the N-grams among each of the second plurality of N-gram strings, and determining a second example sentence candidate among the second candidate example sentences that most similarly matches the second input sentence based on the determined similarities, in response to determining that the second example sentence does not exist; and outputting one of a second translated sentence among the first plurality of example sentences in the first language that is a translation of second example sentence and the second example sentence candidate.

7. A computer readable medium storing a program that causes a computer to execute a process for translation that uses a bilingual example sentence dictionary that stores a first plurality of example sentences in a first language and a second plurality of example sentences in a second language that are translations of the first plurality of example sentences of the first language, the process comprising:

storing a first plurality of first hash values that are hash values of the first plurality of example sentences computed from encoding the first plurality of example sentences and applying a hash function to the encoded first plurality of example sentences;

storing an N-gram TRIE structure comprising a first plurality of N-gram strings, where N-is a natural number, that are N-gram strings of the first plurality of example sentences;

inputting a first input sentence in the first language;

generating a hash value of the first input sentence using the hash function, determining whether there exists a matching hash value among the first plurality of hash values that matches the hash value of the first input sentence, determining a first example sentence among the first plurality of example sentences having the matching first hash value, and determining whether the first example sentence matches the first input sentence;

generating an N-gram string of the first input sentence, counting a number of N-grams of the N-gram string of the first input sentence that match N-grams among each of the first plurality of N-gram strings, and determining similarities between the first input sentence and candidate example sentences among the first plurality of example sentences based on the number of N-grams of the N-gram string of the first input sentence that match the N-grams among each of the first plurality of N-gram strings, and determining a first example sentence candidate among the candidate example sentences that most similarly matches the first input sentence based on the determined similarities, in response to determining that the first example sentence does not exist; and outputting one of a first translated sentence among the second plurality of example sentences in the second language that is a translation of the first example sentence and the first example sentence candidate.

8. The computer readable medium according to claim 7, the process further comprising:

storing a second plurality of second hash values that are second hash values of the second plurality of example sentences computed from encoding the second plurality of example sentences and applying the hash function to the encoded second plurality of example sentences;

storing a second N-gram TRIE structure comprising a second plurality of N-gram strings that are N-gram strings of the second plurality of example sentences;

inputting a second input sentence in the second language;

generating a second hash value of the second input sentence using the hash function, determining whether there exists a second matching hash value among the second plurality of hash values that matches the second hash value of the second input sentence, determining a second example sentence among the second plurality of example sentences having the matching second hash value, and determining whether the second example sentence matches the second input sentence;

generating a second N-gram string of the second input sentence, counting a second number of N-grams of the N-gram string of the second input sentence that match N-grams among each of the second plurality of N-gram stings, determining similarities between the second input sentence and second candidate example sentences among the second plurality of example sentences based on the second number of N-grams of the N-gram string of the second input sentence that match the N-grams among each of the second plurality of N-gram strings, and determining a second example sentence candidate among the second candidate example sentences that most similarly matches the second input sentence based on the determined similarities, in response to determining that the second example sentence does not exist; and outputting one of a second translated sentence among the first plurality of example sentences in the first language that is a translation of the second example sentence and the second example sentence candidate.

9. A method of translating a first sentence in a first language into a second sentence in a second language, the method comprising:

applying a hash function to the first sentence to generate a first hash value of the first sentence;

determining a matching first hash value among a first plurality of hash values, the first plurality of hash values being hash values of a first plurality of example sentences in the first language computed from encoding the first plurality of example sentences and applying the hash function to the encoded first plurality of example sentences, that matches the first hash value;

determining a first result sentence among the plurality of first sentences having the matching first hash value;

determining that the first result sentence does not match the first sentence;

determining a matching second hash value among the first plurality of hash values that matches the first hash value;

determining a second result sentence among the first plurality of sentences having the matching second hash value, the second result sentence linked to the first result sentence in an index;

determining that the second result sentence does not match the first sentence;

generating an N-gram character string of the first sentence;

counting a number of N-grams of the N-gram string of the first sentence that match N-grams of N-gram strings of each of the first plurality of example sentences;

determining similarities between the first sentence and candidate example sentences among the first plurality of example sentences based on the number of N-grams of the N-gram string of the first input sentence that match the N-grams among each of the first plurality of N-gram strings;

determining a first example sentence candidate among the candidate example sentences that most similarly matches the first input sentence based on the determined similarities; and outputting a translated sentence of the first example sentence candidate in the second language as the second sentence.

10. The method according to claim 9, wherein the first result sentence is linked to the second result sentence by a pointer.

11. The method according to claim 10, wherein the pointer is stored in a record of the first result sentence that identifies the first result sentence.

12. The method according to claim 11, wherein the record is a node in an N-gram TRIE structure.

* * * * *